No. 772,737. PATENTED OCT. 18, 1904.
O. M. MOWAT.
LATHE AND DRILL CHUCK.
APPLICATION FILED FEB. 27, 1903.
NO MODEL.

Witnesses:
Geo. B. Rowley.
E. E. Potter.

Inventor:
Oliver M. Mowat
By H. Curtis
Attorneys

No. 772,737.

Patented October 18, 1904.

UNITED STATES PATENT OFFICE.

OLIVER M. MOWAT, OF McKEESPORT, PENNSYLVANIA.

LATHE AND DRILL CHUCK.

SPECIFICATION forming part of Letters Patent No. 772,737, dated October 18, 1904.

Application filed February 27, 1903. Serial No. 145,330. (No model.)

*To all whom it may concern:*

Be it known that I, OLIVER M. MOWAT, a citizen of the United States of America, residing at McKeesport, in the county of Allegheny and State of Pennsylvania, have invented certain new and useful Improvements in Lathe and Drill Chucks, of which the following is a specification, reference being had therein to the accompanying drawings.

This invention relates to certain new and useful improvements in lathe and drill chucks, and relates particularly to that class of chucks in which the drill is held by adjustable jaws.

The invention has for its object to construct a drill and lathe chuck of the above-described class with a plurality of alining-jaws and a pair of driving-jaws, which latter engage and positively drive the drill of any size within the range of the alining-jaws.

A still further object of the invention is to construct a drill and lathe chuck which will not only aline the drill on a portion thereof which lies within the jaws; but also aline the drill at the point where driven, thus assuring the positive alinement of the drill.

Briefly described, my invention comprises, in connection with the body of the chuck, a pair of oppositely-disposed alining-jaws, each of which jaws has staggered teeth, the inclined faces of which are at reverse angles to each other, and a pair of oppositely-disposed driving-jaws having teeth for engagement with the flattened opposite faces of the drill. The jaws are adjusted to move the same toward or away from the center, whereby to grip the drill or release the same by the annular adjusting-ring, having a threaded portion for engagement with the threaded surface of the respective jaws.

In describing the invention in detail reference is had to the accompanying drawings, forming a part of this specification, and wherein like numerals of reference indicate like parts throughout the several views, in which—

Figure 1:
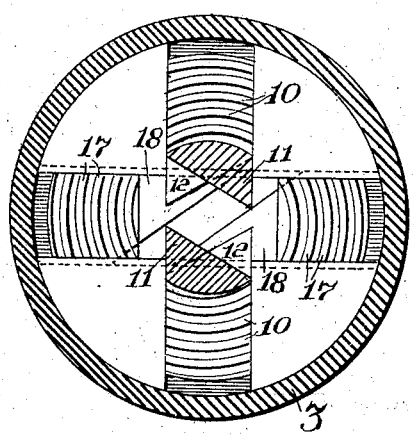
Figure 2:
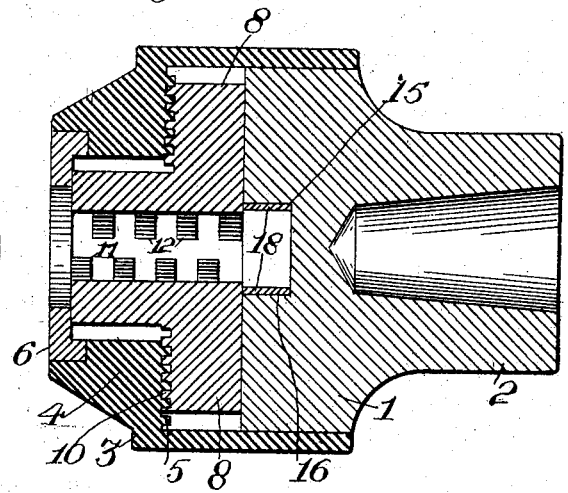
Figure 3:
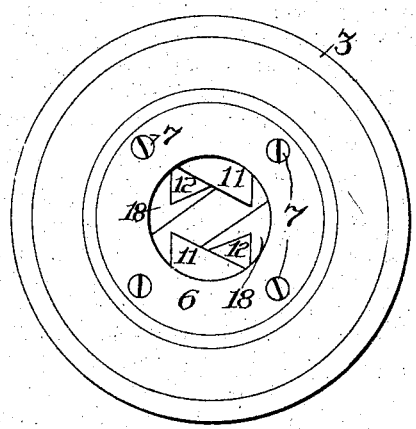
Figure 4:
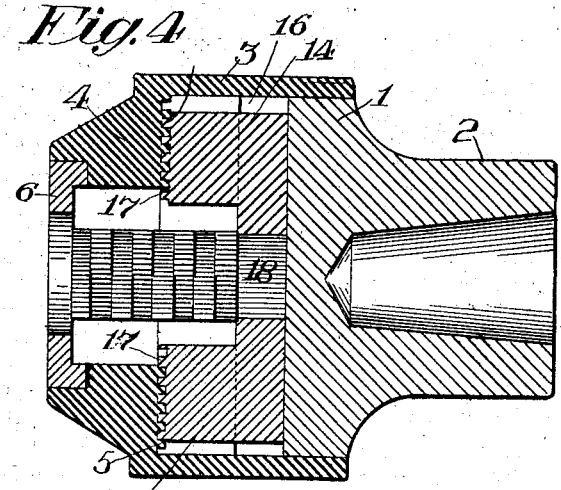
Figures 5, 6:
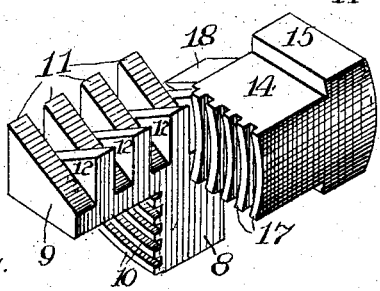

Figure 1 is a transverse vertical sectional view of my improved drill and lathe chuck. Fig. 2 is a longitudinal sectional view of the same. Fig. 3 is an end view thereof. Fig. 4 is a horizontal sectional view. Fig. 5 is a detail perspective view of one of the alining-jaws and one of the driving-jaws detached from the chuck and shown in their relative position to each other. Fig. 6 is a plan view of a part of a drill.

In the accompanying drawings, 1 indicates the cylindrical body of the chuck, which in practice is preferably constructed with a substantially cylindrical extension 2 of less diameter than the body 1 and which is cored out or hollowed to afford means of adjustment to the spindle of the lathe.

Sleeved onto the body portion 1 and revolubly secured thereon in the usual manner, as by a set-screw and peripheral groove, is the adjusting-ring 3, having the annular body portion 4, provided at its inner face with threads 5, and having an annular recess in which is seated the face-plate 6, which is suitably secured to the ring by screws 7 or in any other suitable manner. This face-plate is provided with a suitable opening in order to permit the entrance of the drill in position in the jaws, and the cylindrical body 1, the annular adjusting-ring 3, and the face-plate 6 constitute the framework of the chuck, the said adjusting-ring and face-plate being rotatable in unison on the annular body 1.

Mounted within the chuck and surrounded by the adjusting-ring 3 are a pair of oppositely-disposed driving-jaws. Each alining-jaw comprises the block-like section 8 and a right-angular extending member 9, the outer face of the block or body portion 8 of the alining-jaw having threads 10 to be engaged by the threads 5 of the adjusting-ring. Formed on the right angular or horizontally-extending portions 8 of the alining-jaws are inclined teeth 11 12, which are staggered with respect to each other, and the inclined faces of each set of teeth are at reverse angles to the other. The two alining-jaws are placed opposite to each other, and placed at right angles to these two alining-jaws and working in and out in unison therewith are the driving-jaws 14, having dovetailed heads 15, which work in grooves 16, provided therefor in the body of the chuck. The driving-jaws are provided on their outer ends or faces with threads 17, which, like the threads 10 of the alining-jaws, receive the threads 5 of the adjusting-ring. The driving-jaws are each provided with a tooth 18, the inclined face of which is at a greater angle to the sides of said driving-jaws than the incline on the face of the teeth 11 and 12, and the two driving-teeth 18 of the two driving-jaws are adapted to engage with the flattened faces 19 of the drill 20. The drill, the diameter at the flattened portions of which bear such relation to the diameter of the drill as will permit the two sets of jaws to clamp it simultaneously, is placed in position by spreading the jaws, which is accomplished by the turning of the adjusting-ring in one direction. After the drill has been inserted between the alining-jaws, the adjusting-ring is turned in the opposite direction, which moves the alining-jaws toward each other and simultaneously moves the driving-jaws, so as to engage the driving-teeth 18 thereof with the flattened portions of the drill. Each of the alining-jaws, it will be observed, engages with the periphery of the drill at four points thereof, firmly alining the drill in the chuck, while the driving-teeth of the driving-jaws engage with the flattened portions of the drill and positively drive the same. It is to be noted that the driving-teeth, as will be observed by reference to Fig. 1, engage the flattened portions of the drill simultaneously with the engagement of the periphery of the drill by the alining-teeth, this being possible by reason of the inclined face of the driving-teeth being on a plane beyond the incline face of the one row of alining-teeth of each of the alining-jaws. In other words, the angle of the driving-teeth is greater than the angle of the alining-up teeth, whereby when the adjusting-ring is turned to simultaneously move the four jaws toward each other the driving-teeth engage with the flattened portions of the drill simultaneously with the engagement of the alining-teeth with the periphery or body of said drill.

With this construction it is to be noted that I not only positively drive the drill, but I aline the same so as to positively hold in alinement at all times, and I not only aline the drill between the alining-teeth of the jaws, but I aline the same at the point where driven, assuring the positive alining of the drill from end to end of the jaws and the firm holding of the same. I also desire to call attention to the fact that the point where the screw of the adjusting-ring engages with the screw or threads of the jaws is about midway of the length of said jaws, so that the driving pressure when moving the jaws against the drill is practically evenly divided.

It will be noted that various changes may be made in the details of construction without departing from the general spirit of my invention.

Having fully described my invention, what I claim as new, and desire to secure by Letters Patent, is—

1. In combination with the chuck-body having two perpendicularly-disposed diametrical slots, the first of which is undercut, an adjusting-ring sleeved on said body and having an interior chamber at its rearward end and a reduced opening at its forward end, the forward face of said chamber being provided with a spiral scroll, oppositely-disposed alining-jaws having inclined and staggered teeth and provided with a scroll engaging said spiral scroll and working in the second of said slots, a pair of driving-jaws also in engagement with said spiral scroll and having heads engaging the said undercut slot and a single tooth carried by each of said driving-jaws having a face inclined at a greater acute angle to the sides of said driving-jaws than the inclined teeth of said alining-jaws.

2. In a chuck, the combination of a body part having diametrically-disposed slots, a set of gripping-jaws and a set of driving-jaws, the gripping-jaws having each two sets of oppositely-inclined teeth and the driving-jaws having each a single tooth, and means for simultaneously moving all the said gripping-jaws and driving-jaws toward or from the central axis of the chuck, comprising a ring sleeved on said body and having a scroll in engagement with a scroll on each of said jaws.

In testimony whereof I affix my signature in the presence of two witnesses.

OLIVER M. MOWAT.

Witnesses:
H. C. EVERT,
A. M. WILSON.